United States Patent

[11] 3,558,827

[72] Inventors Pierre M. Lucas
20 rue Tariel, Issy-les-Moulineaux;
Jacques M. Dondoux, 1 rue du Docteur Magnan; Jean F. Duquesne, 120 rue de Javel, Paris; Jean-Marie L. Laprevote, 12 Residence Billebois Mareuil, Rosny-Sous-Bois, France

[21] Appl. No. 727,606
[22] Filed May 8, 1968
[45] Patented Jan. 26, 1971
[32] Priority May 5, 1967
[33] France
[31] 105,429

[54] TELEPHONE SWITCHING SYSTEM WITH INDEPENDENT SIGNALLING CHANNELS EMPLOYING TIME-DIVISION MULTIPLEX
3 Claims, 7 Drawing Figs.

[52] U.S. Cl. .......... 179/18, 179/15(sig)
[51] Int. Cl. .......... H04j 3/12
[50] Field of Search .......... 179/18.9, 15Sig, 18.21

[56] References Cited

UNITED STATES PATENTS 3,377,431 4/1968 Wright et al. .......... 179/18(.21)

*Primary Examiner*—Kathleen H. Claffy
*Assistant Examiner*—Thomas W. Brown
*Attorney*—Abraham A. Saffitz

ABSTRACT: Branched telephone switching system including a principal exchange, intermediate subsidiary exchanges connected to the principal exchange through first information and signalling trunk channels and terminal subsidiary exchanges connected to said intermediate subsidiary exchanges through second information and signalling trunk channels and to the principal exchange through said first and second serially connected information and signalling channels. The information trunk channels and the signalling trunk channels are separate channels. The principal exchange comprises means for transmitting signalling code words to the subsidiary exchanges in successive first time slots respectively assigned thereto and means for receiving signalling code words from the subsidiary exchanges in successive second time slots respectively assigned thereto. Each intermediate and terminal subsidiary exchange comprises means for transmitting signalling code words to the principal exchange in the second time slots assigned to it and means for receiving signalling code words from the principal exchange in the first time slots assigned to it. The intermediate subsidiary exchanges comprise means for switching from the principal exchange towards a given terminal subsidiary exchange the signalling code words occurring in the first time slots assigned to this terminal subsidiary exchange and means for switching from a given terminal subsidiary exchange towards the principal exchange the signalling code words occurring in the second time slots assigned to the former.

INVENTORS:

Pierre M. LUCAS, Jacques M. DONDOUX,
Jean F. DUQUESNE & Jean-Marie L. LAPREVOTE

By Abraham A. Saffitz
ATTORNEY

INVENTORS:
Pierre M. LUCAS, Jacques M. DONDOUX,
Jean F. DUQUESNE & Jean-Marie L. LAPREVOTE
By Abraham A. Saffitz
ATTORNEY

INVENTORS:

Pierre M. LUCAS, Jacques M. DONDOUX,
Jean F. DUQUESNE & Jean-Marie L. LAPREVOTE

By Abraham A. Saffitz
ATTORNEY

INVENTORS:
Pierre M. LUCAS, Jacques M. DONDOUX,
Jean F. DUQUESNE & Jean-Marie L. LAPREVOTE
By Abraham A. Saffitz
ATTORNEY

PATENTED JAN 26 1971 3,558,827

INVENTORS:

Pierre M. LUCAS, Jacques M. DONDOUX,
Jean F. DUQUESNE & Jean-Marie L. LAPREVOTE

By Abraham A. Saffitz
Attorney

TELEPHONE SWITCHING SYSTEM WITH INDEPENDENT SIGNALLING CHANNELS EMPLOYING TIME-DIVISION MULTIPLEX

The invention relates to time-division multiplex telecommunication system in which a number of switching centers or exchanges are interconnected by message channels and separate independent signalling circuits.

Telephone transmission systems of this kind are known from the prior art, and have in particular been described in an article entitled "A Study of the Basic Principles of a Rapid Signalling Method" by Pierre Lucas, published in "Annales des Telecommunications," Mar.—Apr. 1966, Vol. 21, No. 3—4, pages 61—87. In these systems a single signalling circuit is associated with a plurality of information-transmitting or message channels, and the signals relating to the establishment, supervision and release of a message connection are provided with a specific indication or "label," indicating the message channel to which they are to be applied.

U.S. Pat. No. 2,979,571, issued Apr. 11, 1961, also describes a telephone exchange and a satellite station connected by separate signalling and message channels and shows in its FIG. 1 the signalling channel represented by lines 20—22 and the message channels represented by lines 21.

The object of the invention is to provide a telephone switching system including a number of switching exchanges interconnected by channels transmitting analogue or numerical signals, in which the message and signalling channels are separated, and which comprises in addition to a principal exchange at least two ranks of secondary exchanges, where the exchanges of the first rank are traversed by the signalling channels linking the principal exchange with the exchanges of the second rank, said subsidiary exchanges forming a branched network.

According to the invention, the signalling signals are transmitted sequentially in the form of words of predetermined length at recurrent time intervals, and are assigned respectively to the subsidiary exchanges of the first rank and to the subsidiary exchanges of the second rank, whose signalling channels are in part formed by the signalling channels of the first-rank subsidiary exchange, and the signal-transmitting and signal-receiving devices of each subsidiary exchange are activated, thanks to a general synchronization, only during the time intervals assigned to said subsidiary exchange.

According to another feature of the invention, each signalling work comprises a code-check group. The principal exchange and the subsidiary exchanges comprise circuits for checking the code of the received signalling words, means for transmitting, following the transmitted signalling words and as an appendix thereto, an acknowledgment word having two possible compositions according to whether the signalling word received is valid or not, and means for repeating the signalling word when the acknowledgment relating thereto indicates an error.

The invention will now be described in detail with reference to the accompanying drawings, wherein.

Figure 1:
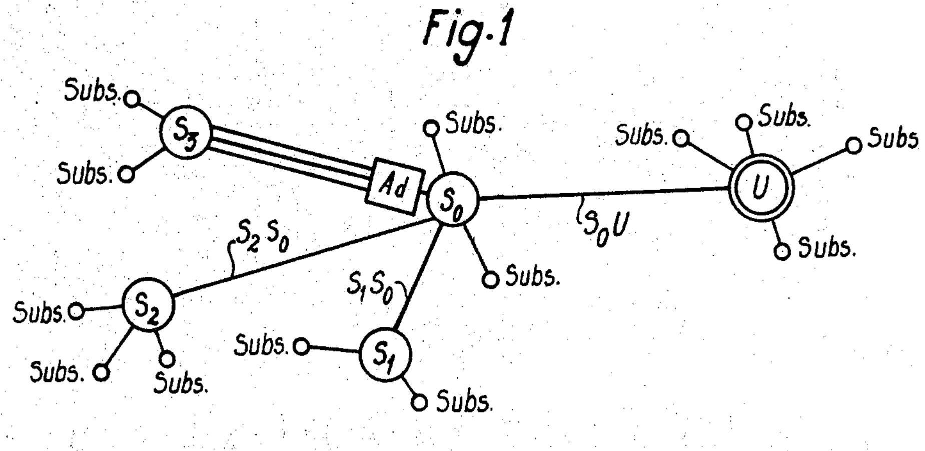
FIG. 1 illustrates the structure of a branched communication network to which the invention can be applied.

FIG. 1 shows a principal exchange U, a first-rank subsidiary exchange $S_o$ and three second-rank subsidiary exchanges $S_1$, $S_2$, $S_3$ as well as subscribers connected to the principal and to the subsidiary exchanges. The subsidiary exchanges $S_o$, $S_1$, $S_2$ operate with independent signalling channels, while $S_3$ is a subsidiary exchange operating with channel-by-channel signalling. The principal exchange and the subsidiaries $S_o$, $S_1$, $S_2$ are linked by signalling channels $S_0U$, $S_1S_0$, $S_2S_0$; the speech circuits are not shown. It can be seen that the signalling network is of the branched type as distinct from the mesh type, i.e. the signalling channels linking the exchanges of higher rank to a common central exchange combine in a single signalling channel connecting said exchange to a single exchange of lower rank. Thus, the signalling channels $S_1S$ and $S_2S$ continue in the signalling channel $S_0U$.

As mentioned, the exchange $S_3$ is of the electromechanical type and operates with channel-by-channel signalling. Consequently, there is no signalling channel $S_3S_0$, but $S_0$ comprises an adapter device which transforms the time-division signalling employed on signalling channels in a space division, channel-by-channel signalling.

Figure 2:
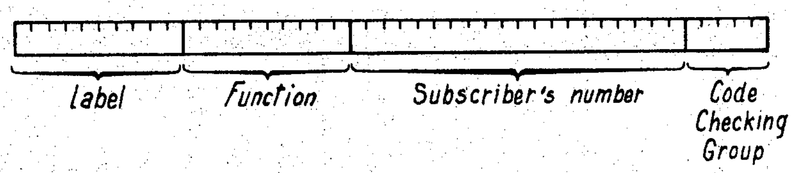
FIG. 2 shows the structure of a signalling word.

FIG. 2 illustrates the structure of a signalling word. This word comprises:

ten bits constituting a label which makes it possible to assign the word to a specific communication, generally referenced by the number of the speech circuit used, i.e. the rank of this circuit within the group of speech circuits associated with the signalling channel;

ten bits constituting the function code characterizing the actual state of the communication, e.g. answer by the previously selected and called subscriber;

twenty bits containing the number of the calling or called subscriber or both;

five bits forming a code-checking group.

The exact constitution of the signalling word may of course vary widely, and the signalling system according to the invention does not depend in any way of the constitution of this word.

In order to signal to the transmitting end of the signalling channel the correct reception or the necessity of repetition of the signalling word, an acknowledgment signal is transmitted in the opposite direction of the signalling channel according to procedure to be described later.

The signalling over the signalling channels of the terminal network of FIG. 1 is characterized by the following features:

it is of the "data transmission" type, in sequential mode;

the signalling in each direction of the signalling channel is effected by periodic trains of binary digits of constant length, as already described;

periodicity of the binary digits and of the words is identical in the whole of the channel network, the synchronism being defined by a timer at the local exchange U which sets the basic rhythm. All signals transmitted by the exchange U are synchronized with this basic rhythm. All the signals transmitted by a subsidiary exchange $S_0$ of first rank over all signalling channels are synchronized with the rhythm of the signals received from the exchange U over the channel S0U. All the signals transmitted by the subsidiary exchanges $S_1$, $S_2$, $S_3$ of the second rank are synchronized with the rhythm of the signals received from the exchange $S_0$ over the channels $S_1S_0$, $S_2S_0$, $S_3S_0$.

This synchronism which affects both the binary digits and the words are maintained by known means, of which a great number are available. For example, each word start can be considered as a start of a frame in the sense of multiplex pulse code modulation transmission and an alternately positive and negative pulse can be placed at the beginning of each frame.

In the channel network as a whole, the transmitted words are distributed in time in such a manner, that the definite time is assigned to the words addressed to a given subsidiary exchange. More precisely, if $t_0$, $t_1$, $t_2$, $t_3$ .... represent the instants of transmission according to the above-specified synchronism, of $p$ consecutive words ($p$ being the maximum number of subsidiary exchanges within the channel network), the times $t_0$, $t_1$, $t_2$, $t_3$ will be assigned to communications with the exchanges $S_0$, $S_1$, $S_2$, $S_3$ respectively. Thus, on the signalling channel leading from U to $S_0$, the times $t_0$ will be used for the words addressed to $S_0$, while the other times $t_1$, $t_2$, $t_3$ .... will be assigned to the words transmitting through $S_0$ to $S_1$, $S_2$, $S_3$ .... . On the signalling channel leading from $S_0$ to $S_1$ (or $S_2$), only the time $t_1$ (or $t_2$) will be used, assigned to the words to be transmitted to the exchange $S_1$ (or $S_2$).

The words transmitted with different timing will not be considered in $S_1$ (or $S_2$) and further do not reach this station.

In the reverse direction, i.e. for the words going towards the exchange U, a similar arrangement will be used. If $t'_0$, $t'_1$, $t'_2$, $t'_3$ .... are the successive transmission times of the words, these times are respectively assigned to the transmission of the messages coming from $S_0$, $S_1$, $S_2$, $S_3$; with regard to $S_3$, the time $t'_3$ will be used only between $S_0$ and U, because from $S_3$ to $S_0$ the signalling is carried out channel by channel. Thus, on the signalling channel leading from $S_1$ (or $S_2$) to $S_0$, only the time $t'_1$ (or $t'_2$) is effectively used; it is assigned to the messages which, after transit through $S_0$, will be retransmitted over the channel S0U. On this signalling channel leading from $S_0$ to U, the times $t'_1$, $t'_2$, $t'_3$ are therefore assigned to the words coming from $S_1$, $S_2$, $S_3$ after transit through $S_0$, while the time $t'_0$ is assigned to the words originating in $S_0$.

Each word signalling transmitted in a given direction is subjected to a validity check at the receiving exchange and causes an acknowledgment to be transmitted in the reverse direction over the signalling channel. This acknowledgment is formed by a small number (e.g. two or three) of bits, which are affixed to the first word transmitted in the reverse direction. In order to equalize the waiting time of the acknowledgment in the two directions of the signalling channel, the transmission times of the words are staggered in the two directions of the channel, by a value equal to half the transmission time of a word. Thus, the times $t'_0$, $t'_1$, $t'_2$, $t'_3$ will be set off by a half-time relative to the times $t_0$, $t_1$, $t_2$, $t_3$, as shown in FIG. 3.

Figure 3:
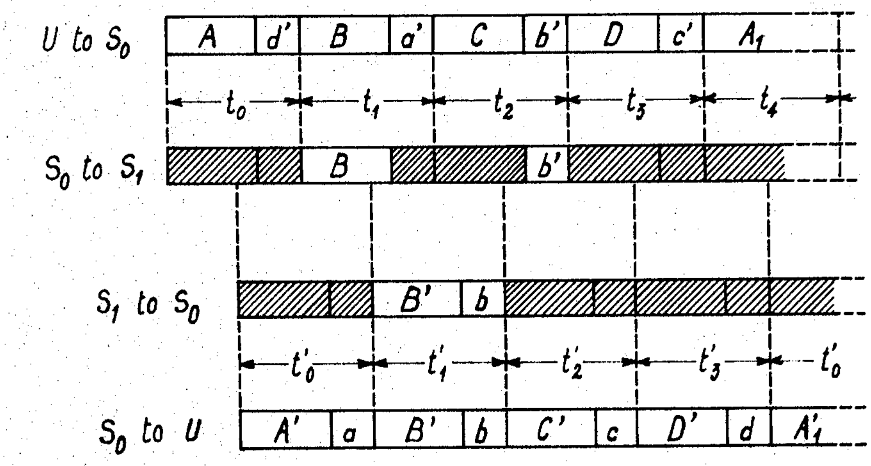
FIG. 3 illustrates the multiplexing of the signalling words in each direction of transmission over the single signalling channel.

In FIG. 3,

A represents a word transmitted from U to $S_0$
B represents a word transmitted from U to $S_1$ via $S_0$
C represents a word transmitted from U to $S_2$ via $S_0$
D represents a word transmitted from U to $S_3$ via $S_0$
A' represents a word transmitted from $S_0$ to U
B' represents a word transmitted from $S_1$ to U via $S_0$
C' represents a word transmitted from $S_2$ to U via $S_0$
D' represents a word transmitted from $S_3$ to U via $S_0$ Furthermore, *a, b, c, d, a', b', c', d'* are the acknowledgment appendices respectively of A, B, C, D, A', B', C', D'.

The rigid timing of the signals exchanged over the network shown in FIG. 1 makes it possible to simplify substantially the control programmers of small exchanges, owing to the following advantages:

a. Each exchange $S_0$, $S_1$, $S_2$ and, with regard to $S_3$, the adapter located in $S_0$, has to decode and to interpret only the words of its characteristic time $t_0$, $t_1$, $t_2$ or $t_3$. It does not have to read and analyze any other signals to determine whether these were addressed to it.

b. The intermediate exchange $S_0$ accordingly has only to redistribute without modification and instantaneously the words received from U, at times other than $t_0$, to the other subsidiary exchanges of its zone or to the adapters associated with certain of these subsidiary exchanges. Similarly, it retransmits to U without modification and instantaneously the words received from the exchanges $S_1$, $S_2$ and, in the case of $S_3$, from the adapter located in $S_0$, at times other than $t'0$, this operation being a simple juxtaposition of the disjoined signals.

c. As FIG. 3 shows, the transmitter elements of the exchanges $S_1$, $S_2$ and the adapter associated with $S_3$ are operative only at specific instants of periodical nature, which facilitates the synchronization for these exchanges.

d. In the exchange of signalling words between two specific exchanges, e.g. U and $S_0$ or U and $S_1$, the acknowledgment appendix of a previously transmitted word is always received before the next word of the same communication. The acknowledgment of A, i.e. *a*, is received by U prior to the instant of transmission of the next word $A_1$; similarly *b*, the acknowledgment of B, is received by U before the instant of transmission of $B_1$. In reverse direction, *a'* is received by $S_0$ before the instant of transmission of $A'_1$, and *b'* is received by $S_1$ prior to the transmission of $B'_1$. The result hereof is, that in case of a repetition always the last transmitted word will be repeated so that there is no need for storing the preceding words in view of a possible repetition. Another consequence is that repetitions cannot invert the logical reception sequence of the words of a communication.

e. This concept makes it possible to adapt to the system without any difficulty the electromechanical exchanges operating with channel-by-channel signalling, as will be explained later, provided that the code conversion of channel-by-channel signalling produces words of the same type as those considered in the foregoing. In particular, the intermediate exchange $S_0$ in FIG. 1 may consider the output of the "signalling adapter" Ad associated with the subsidiary exchange $S_3$ exactly as a signalling channel, because it does not interpret the signals retransmitted by it at the instants $t_3$, $t'_3$.

f. The only exchange which has to carry out a slightly complicated interpretation of the signals is the exchange U, at the apex of the branched network. It will be assumed here that this exchange is provided with a control computer of a known type, with stored program.

Figure 4:
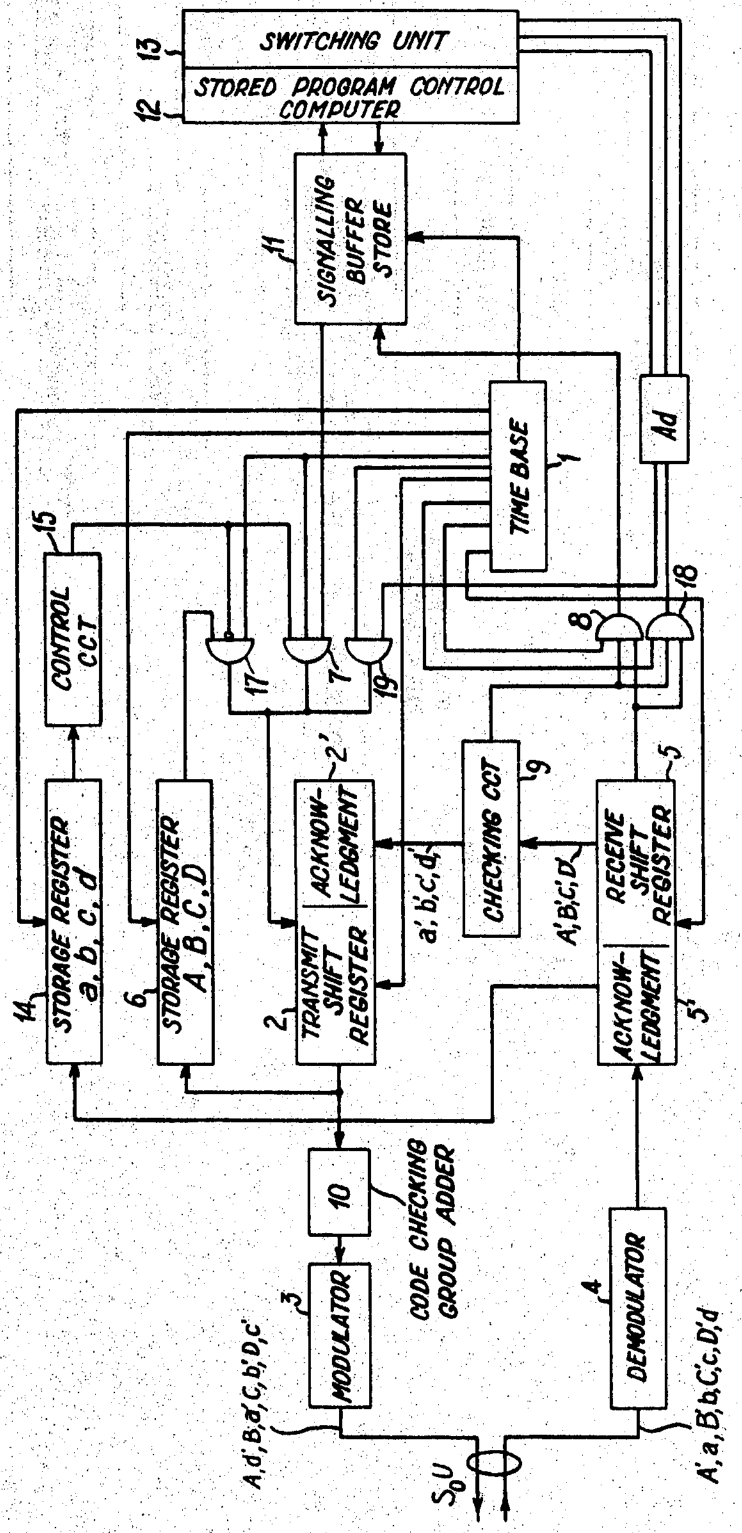
FIG. 4 is a block diagram of the principal exchange.
Figure 5:
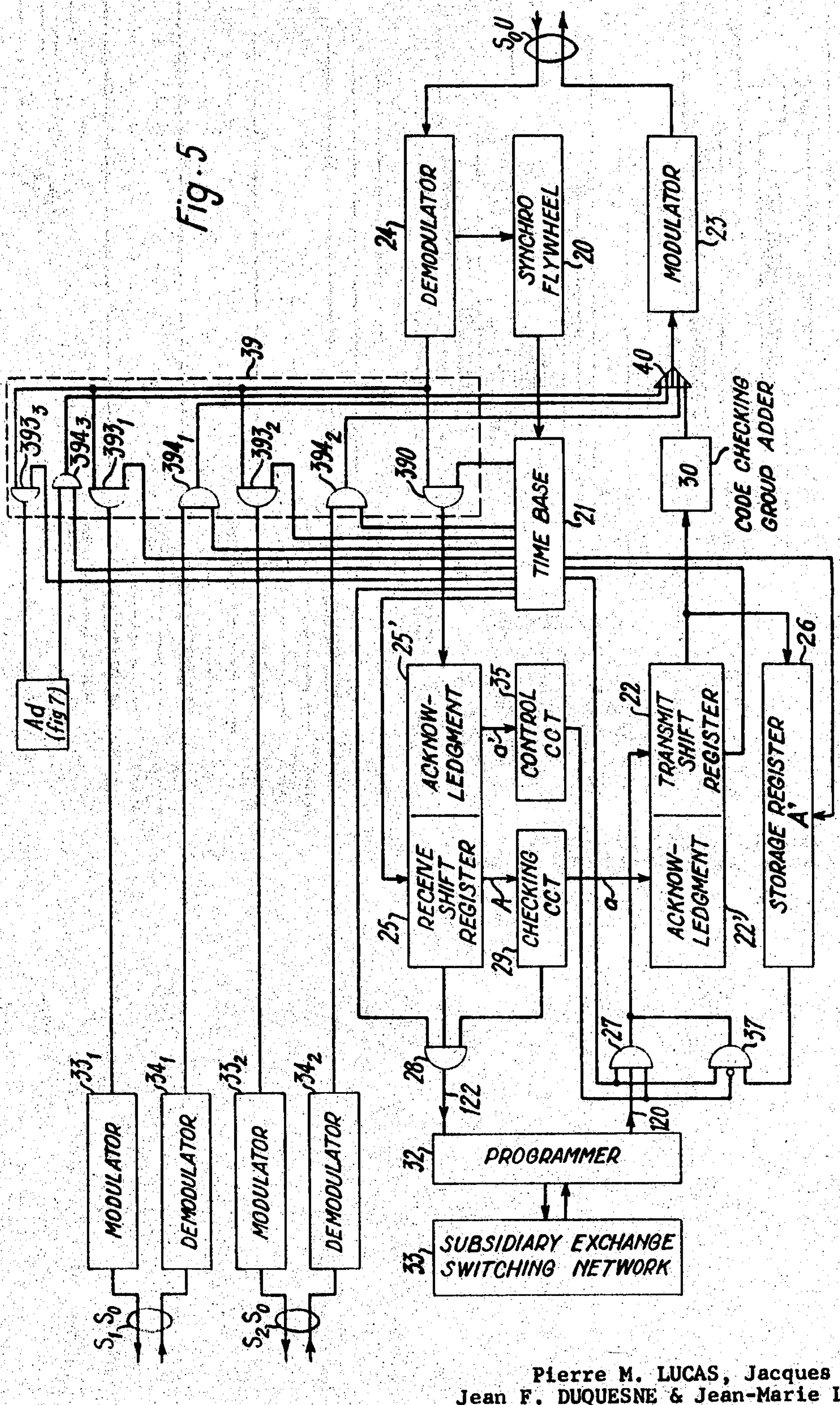
FIG. 5 is a block diagram of a first-rank subsidiary exchange.
Figure 6:
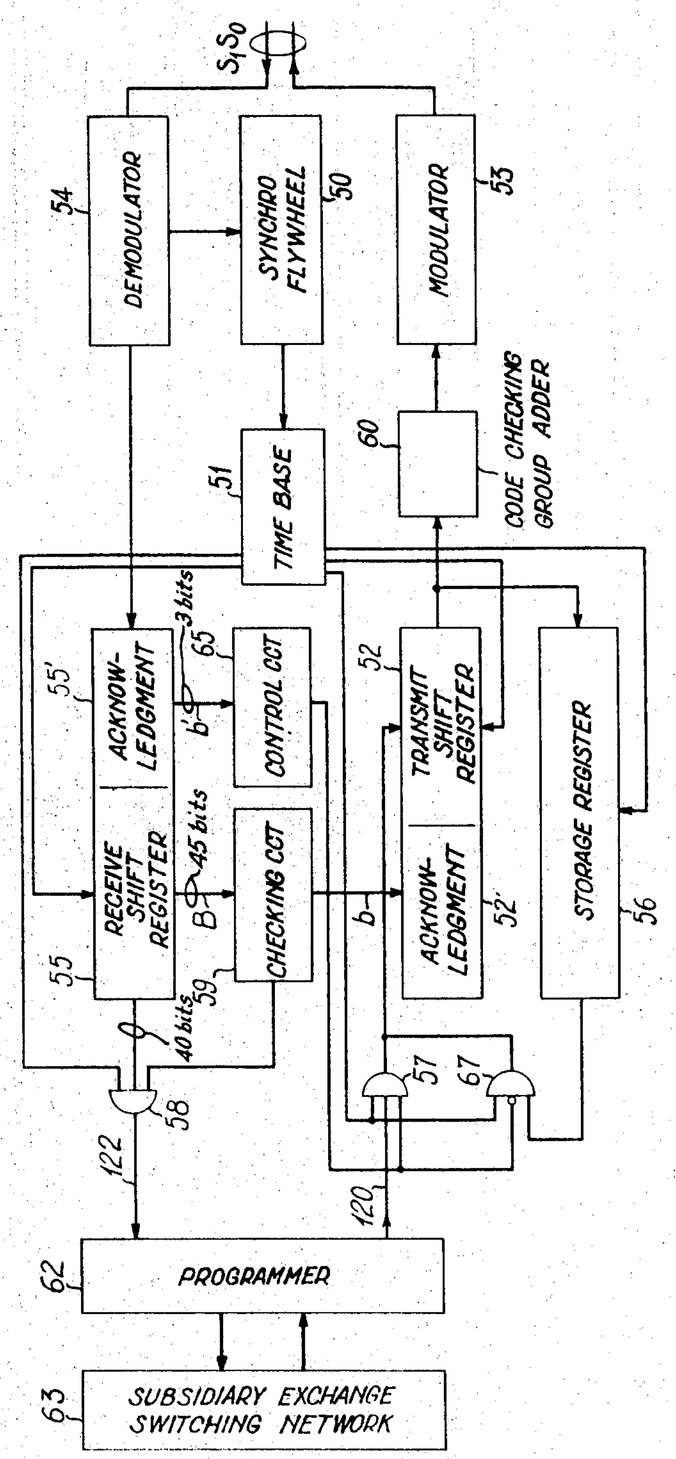
FIG. 6 is a block diagram of a second-rank subsidiary exchange.

Reference will now be made to FIGS. 4, 5 and 6, which illustrate respectively the signalling transmission and reception circuits of the exchanges U, $S_0$ and $S_1$ in the form of block diagrams.

The overall synchronization of the time division switching system is provided by a time base 1, located in U. The exchanges $S_0$ and $S_1$ comprise time bases 21 and 51 respectively, which are interlocked with the time base 1 in the manner described hereinafter.

Each exchange comprises a modulator inserted in the outgoing path of the signalling channel which connects it to another exchange and a demodulator inserted in the return path coming from this other exchange. The modulators are referenced with 3 in U (FIG. 4), with 23, $33_1$, $33_2$ in exchange $S_0$ (FIG. 5) and with 53 in the exchange $S_1$ (FIG. 6). The demodulators bear reference 4 in U, 24, $34_1$ and $34_2$ in $S_0$ and 54 in $S_1$.

The exchange U contains a switching unit 13, a stored program control computer 12 which controls this switching unit and a signalling buffer store 11 cooperating with this computer. This buffer store is connected to a transmit shift register 2 through a transmission transfer gate 7, and with a receive shift register 5 through a reception transfer gate 8. The transmit shift register 2 is connected to a storage register 6 whose function will be explained and to modulator 3 by way of a device 10 which adds to the signalling word the code-checking group, while modulator 3 is in turn, as already said, to the outgoing path of the channel $S_0$U. The incoming path of this channel $S_0$V is connected to demodulator 4 and the latter is connected with the receive shift register 5.

The transmit shift register 2 comprises a part 2' intended to receive from a code-checking circuit 9 a signal having two possible compositions, one indicating that the word being received has been correctly transmitted (called "positive acknowledgment"), the other indicating that the transmission is incorrect and has to be repeated (called "negative acknowledgment"). This circuit 9 receives from the receive shift register 5 the words A', B', C', D' and transmits acknowledgements *a', b', c', d'*, positive or negative according to whether the code of the signals received is correct or incorrect.

It was stated in connection with FIG. 3 that in the subsidiary exchanges the acknowledgement, for example *b'*, arrived after transmission of the word B', of course, but before transmission of the next word $B'_1$ having the same destination. Therefore, at the instant of arrival of the acknowledgment *b'*, the word B'has not been replaced by $B'_1$ in the transmit shift register of the subsidiary exchange and may be repeated from the storage register 56 (see FIG. 6) if the acknowledgment is negative. This is not so in the principal exchange U. At the instant of arrival of *a* , A has been transmitted and B is already in the shift register 2 and is being transmitted. It is therefore necessary to store A in a storage register 6 and similarly to store *a* in a storage register 14. These storage registers are shift registers. The signal issues from the register 14 at the end of time $t_3$, is transformed into a control pulse in the control circuit 15 and opens either the gates 7 for the transfer 11–2 or the gates 17 for the transfer 6–2, depending on whether the word A should not be or should be repeated.

The checking circuit 9 also produces a control pulse which opens or closes the gates 8 of the transfer between the receive shift register 5 and the buffer signal store 11.

The intermediate exchange $S_o$ has a switching network 33 (see FIG. 5), controlled by a programmer 32, further a modulator 23, a demodulator 24, a time base 21, a transmit shift register 22 and a reception shift register 25. The programmer 32 is connected through gates 27 to the transmission shift register 22 which comprises a part 22' providing the acknowledgment *a*. This shift register 22 is connected to a code-checking group adder 30, which is in turn connected to the modulator 23 through the OR gate 40, which effects the multiplexing of the paths coming from $S_1$ and $S_2$ with the path coming from $S_o$. The demodulator 24 is connected, through a multiplexor 39 which will be discussed later, to the receive shift register 25 which comprises a part 25' provided for the acknowledgment *a'*. This shift register 25 is connected to the programmer 32 through the gates 28.

The code-checking circuit 29 receives from the receive shift register 25 the word A and transmits to the part 22' of the transmit shift register 22 an acknowledgment *a*, which has two possible compositions, one indicating that the word being received was correctly transmitted while the other indicates that the transmission is incorrect and must be repeated. The code-checking circuit 29 also produces a driving pulse which opens or closes the transfer gates 28 between the receive shift register 25 and the programmer 32.

The acknowledgment *a'* received in part 25' of shift register 25 is applied to the control circuit 35 which converts it into a driving pulse which is fed to the gates 27 and 37 so as to admit into the transmit shift register either a word $A'_1$ coming from the programmer 32 or the word A', previously transmitted and temporarily stored in the storage register 26.

The demodulator 24 is connected to a synchroflywheel 20 which controls a time base 21. The latter in turn controls the shift registers and the various transfers.

The demodulator 24 is connected to the modulators $33_1$ and $33_2$ of the signalling channels $S_1S_o$ and $S_2S_o$ through the switch 39 controlled by the time base 21. Furthermore, the signalling channels $S_1S_o$ and $S_2S_o$ are connected to the demodulators $34_1$ and $34_2$, which are in turn linked, via the switch 39, with the OR gate 40 and the modulator 23.

The switch 39 comprises the AND gates $393_1$, $393_2$, $394_1$, $394_2$, the first two of which provide access for the channel $S_oU$ to the channels $S_1S_o$ and $S_2S_o$, while the last two provide access for the channels $S_1S_o$ and $S_2S_o$ to the channel $S_oU$. These gates are opened by the time base 21 at the appropriate instants. FIG. 3 shows that the gates $394_1$ and $394_2$ must be opened respectively during the periods $t'_1$ and $t'_2$, since in the channels $S_1S_o$ and $S_2S_o$ in the direction of $S_o$ the words B' and C' are immediately followed by the respective acknowledgements *b* and *c*. On the other hand, the gates $393_1$ and $393_2$ must be opened, the first for a fraction of $t_1$ to allow passage for the word B and for a fraction of $t_2$ to allow passage for the acknowledgment *b'*, the second for a fraction of $t_2$ to allow passage to the word C and for a fraction of $t_3$ to allow passage for the acknowledgment *c'*.

The AND gate 390 controls the access of the signalling channel $S_oU$ to the subsidiary exchange $S_o$.

In FIG. 5, the switch 39 is shown as being constituted of AND gates. Each gate may be followed by a pulse regenerator here not shown.

FIG. 6 illustrates the subsidiary exchange $S_1$. It is quite similar to the subsidiary exchange $S_o$, except that it does not contain the switch 39, the modulators $33_1$ and $33_2$ and the demodulators $34_1$ and $34_2$. The similar circuits of FIGS. 5 and 6 are designated by reference numerals differing by 30.

The mode of functioning of the telephone signalling system is as follows:

1. Exchange of signals from U to $S_1$:

The computer 12 inputs the word to be transmitted into the signalling buffer store 11. When the time base 1 indicates the start of slot $t_1$, the gates 7 introduce the word B in parallel into the transmit shift register 2. Then, controlled by the time base 1, the binary digits are transmitted, after modulation by 3, over the signalling channel $S_oU$.

Appropriately to the time $t_1$, the time base 21 has opened the gate $393_1$; the pulses are demodulated in 24, regenerated if necessary, remodulated in $33_1$ and transmitted over the channel $S_1S_o$.

On arrival in the exchange $S_1$, the pulses are demodulated in 54 and the binary digits are introduced in series into the receive shift register 55. The word B thus obtained in the shift register 55 is introduced in parallel into the code-checking circuit 59 which checks its validity. If the word B is valid, 59 opens the gates 58 and the word is introduced into the programmer 62. At the same time, 59 inputs a positive acknowledgment *b* into the part 52' of the transmit shift register 52. This acknowledgment will be transmitted at the end of the word B' of the other direction, that is, about a half-period later (towards the end of time $t'_1$).

Towards the middle of $t_1$, the exchange U, while transmitting the word B, finished the reception of the word A' (see FIG. 3) coming from $S_o$. This word is checked by the code-checking circuit 9 and, according to whether the word is found to be valid or not, 9 inputs a positive or negative acknowledgment *a' into 2'. This acknowledgment a'* is transmitted after B. This acknowledgment does not pass through $393_1$ but passes through 390 and is fed to 25'. It is checked in 35 which, if *a' is positive, emits a pulse opening the gates 27 and if it is negative emits a pulse which opens the gates 37. In the first case,* $A'_1$ *is admitted into the transmit shift register 22.*

The transmission of *a' takes place during the slot* $t_1$, during that fraction of slot which coincides with $t'_1$. During this slot $t'_1$, the exchange U receives from $S_1$ the word B' as will be seen, and this word is checked by the code-checking circuit 9. By the same process, this checking produces an acknowledgment *b'* which is introduced into 2' slightly after half of slot $t_2$ has passed. This acknowledgment *b'* is transmitted at the end of time $t_2$, following the signal C.

The acknowledgment *b'* passes the gate $393_1$ in $S_o$, is demodulated in 54 and introduced into the part 55' of 55. It is then checked by 65. If positive, 65 recognizes it and holds it in memory until the time $t'_1$ following, when the pulse generated by the time base 51 will open the gates 57 and the word $B'_1$ coming from the programmer 62 will be admitted into the transmission shift register 52. If the acknowledgment *b'* is negative, it is recognized by 65 and held in memory until the commencement of the next period $t'_1$ when the pulse produced by the time base will open the gates 67 and the word B stored in the storage register 56 will be admitted into 52. Consequently, the preceding word B' will be repeated at the next time $t'_1$.

2. Exchange of signals from $S_1$ to U:

At the beginning of time $t'_1$, assuming that 65 has previously read a positive acknowledgment *b'*, the gates 57 were, as seen, opened and the signal B' admitted into the transmit shift register 52. Towards the middle of the transmission period $t'_1$, the code-checking circuit 59 introduced into the part 52' of shift register 52 the acknowledgment *b* concerning the signal B received by $S_1$. The word B' and the acknowledgment *b'* are transmitted consequently during the time $t'_1$.

In $S_o$, B' and *b* are demodulated in $34_1$, pass through the gate $394_1$ and are remodulated in 23. In U, these signals are received in the receive shift register 5 after demodulation in 4 during the time $t'_1$. The word B' is checked in the code-checking circuit 9 which produces a positive or negative acknowledgment $b'$ which is fed into 2' at the middle of period $t_2$. If the acknowledgment $b'$ is positive, the code-checking circuit 9 opens the gates 8 and the word B' is introduced into the signalling buffer store 11.

The acknowledgment $b$, which must not act before the commencement of the subsequent period $t_1$ to indicate whether $B_1$ is to be transmitted or B is to be repeated, is introduced into the storage register 14. At the start of the next period $t_1$, $b$ issues from 14 and opens the gates 7 if positive, or the gates 17 if negative.

It is not necessary to describe the structure of programmers 32 and 62 which control the connecting networks 33 and 63 because such programmers are well known. It can be assumed for example that the switching networks 33 and 63 are electronic networks of the type which is referenced 10 in FIG. 1 of the U.S. Patent above referred to and that the programmers 32 and 62 are constituted by the set of circuits which, in this same FIG., controls the connecting network referenced 10 from the outgoing path referenced 20 and the incoming path referenced 22 of the signalling channel. In FIGS. 5 and 6, references 120 and 122 designate the lines which are equivalent to the lines 20 and 22 of the aforecited U.S. Patent to facilitate the understanding of the control of the switching network by its associated programmer.

Figure 7:
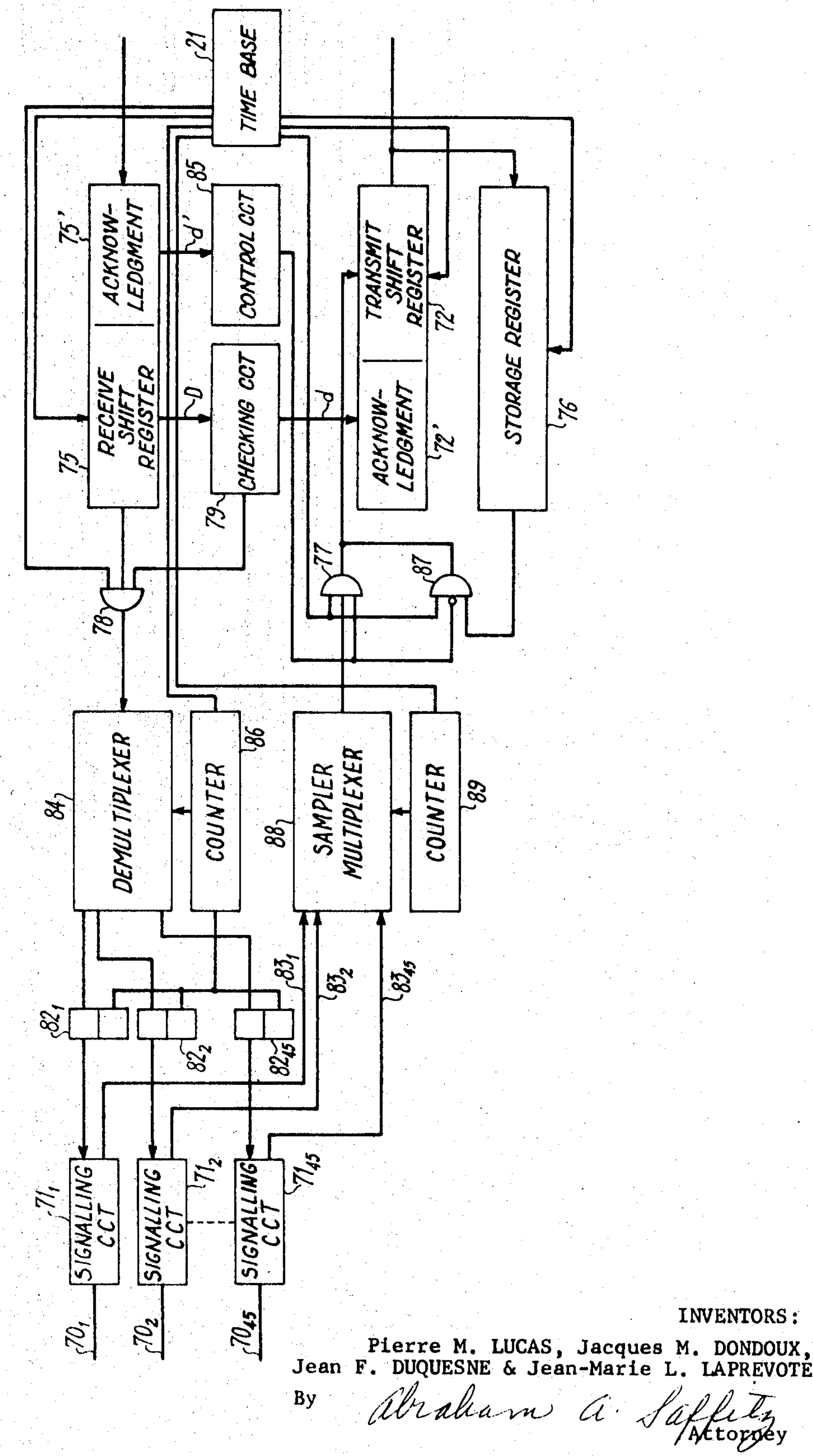
FIG. 7 illustrates a device for adapting a system wherein message transmission and signalling are effected over common channels to a system wherein the transmission of the messages and the signalling are carried out over separate channels.

FIG. 7 illustrates the adapter device A$d$ which makes it possible to change from an independent signalling channel system to a joint message and signalling channel system. Such adapters are placed respectively in the immediate proximity of the sub-station $S_0$, connected thereto by a trunk of the signalling channel, and in the principal exchange. In the latter, the adapter Ad is connected to the transmit and receive shift registers 2 and 5 by AND gates 19 and 18 respectively, which are opened at the times $t_3$ and $t'_3$. The result is that the words D will come from the adapter and not from the signalling buffer store, and that the words D' will go to the adapter and not to the signalling buffer store. The lines leaving the adapter Ad of FIG. 4, which are lines operated in both directions, lead directly to the switching unit 13.

In the following it will be assumed that the structure of the words D and D' is identical to that of the words A, B, C, A', B', C', but have a different meaning. In the words D and D' each binary digit indicates the presence or the absence of a signaling signal on a channel of the group of channels. It is further assumed that there are 45 channels, that each of the 45 binary digits of a word corresponds to a channel and that each digit is either a 1 or a 0 according to whether there is a signalling signal on the channel associated with said digit or not. Other arrangements are also possible, for example each channel may have an address of six binary digits and a corresponding binary digit indicating the presence or absence of a signal. Some of the 45 binary digits of a word may be inoperative of course, or may be used for checking purposes.

FIG. 7 shows 45 channels referenced $70_1$ to $70_{45}$, each terminated by a signaller $71_1$—$71_{45}$. The output terminals of the signallers are connected to flip-flops $82_1$—$82_{45}$. These flip-flops are controlled by a demultiplexer or distributor 84 which distributes on the various output terminals the binary digits of the word D. This distributor 84 is in turn controlled by a counter 86 receiving the counting pulses from the time base 21 of exchange $S_0$ during the time $t_3$.

The receiving terminals of the signallers are connected by wires $83_1$—$83_{45}$ to a sampler-multiplexer 88 which is in turn controlled by a counter 89 receiving from the time base 21 the counting pulses during the time $t'_3$.

The demultiplexer 84 is connected to the trunk of the channel $S_3S_0$ through the receive shift register 75, which has a part 75' to accommodate the acknowledgment, and the gate 78, these being equivalent to the circuits 55, 55' and 58 respectively of FIG. 6. The sampler-multiplexer 88 is connected to the trunk of channel $S_3S_0$ through the gate 77 and the transmit shift register 72 which comprises a part 72' provided for the acknowledgment, these being equivalent to the circuits 57, 52 and 52' of FIG. 6. The code-checking circuit 79, the control circuit 85, the storage register 76 and the gate 87 are equivalent to the circuits 59, 65, 56 and 67 of FIG. 6. The acknowledgment $d$ is elaborated in the same manner as the acknowledgment $b$ (FIG. 6), and the acknowledgment $d'$ initiates, according to its value, either the transmission of the next word $D'_1$ or the repetition of the word D' being handled, by controlling the opening of gate 77 or of gate 87. The sole difference between the functioning of the subsidiary exchange $S_2$ and the adapter A$d$ is that the words are transmitted in parallel from 55 to 62 or from 62 to 52, while they are transmitted in series from 75 to 84 or from 88 to 72.

In the case where the acknowledgements $d$ and $d'$ would not be required or appropriate for the words D and D', the trunk of channel $S_3S_0$ would engage directly the demultiplexer 84 and the sampler-multiplexer 88.

The words D and D' in fact contain in multiplexed form exactly the same information as the plurality of wires "Transmission" and "Reception" of the signallers. The computer 12 may therefore comprise:

a program for analyzing the signals D' received, which would reconstitute for each circuit of the group its individual signalling from the sampling;

a program for recording and interpreting the signals received which would initiate the decisions imposed by the reception of each signal (i.e. decisions leading either to an operation of the switching unit 13, or to the formation of a return signal A (to $S_0$) or D (to $S_3$);

a program for generating the signals D to be transmitted to $S_3$, which would effect the sampling of the conditions to be transmitted over each "Transmission" wire and their grouping in a signal D of the format shown in FIG. 2. Shift registers such as 2, 22, 52, 72, 5 25, 55 and 75 are known in the art (see Design of Transistorized Circuits for Digital Computers by Abraham I. Pressman, John F. Rider Publisher, Inc. New York, fourth Edition, Oct. 1961, pages 2.30 and 2.31). They comprise a number of flip-flop stages, a serial input into the first stage, a serial output from the last stage, and parallel inputs into and parallel outputs from all the stages together. It has been shown in FIG. 2 that each signalling word comprised 45 bits of which five form the code-checking group. It has also been explained that the acknowledgment appendix word comprised two or three bits, say, for example, three. Accordingly, the shift registers have 48 flip-flop stages. In the case of shift register 55, for example, the 48 bits of a signalling word including the acknowledgment appendix serially enter the register coming from the signalling channel through demodulator 54. The 45 first bits of the word are transferred in parallel first into checking circuit 59 and, when this circuit 59 has checked the code-checking group formed by the 41st, 42nd, 43rd, 44th and 45th bits, the 40 first bits of the word are transferred in parallel into programmer 62. The three bits of the acknowledgment appendix are transferred in parallel into control circuit 65 for having the acknowledgment readout.

We claim:

1. A branched telephone switching system including:

a. a principal exchange;

b. first and second message and signalling trunk channels, said message trunk channels and said signalling trunk channels being separate channels;

c. intermediate subsidiary exchanges connected to said principal exchange through said first message and signalling trunk channels;

d. terminal subsidiary exchanges connected to said intermediate subsidiary exchanges through said second message and signalling trunk channels;

said principal exchange (a) comprising means for transmitting signalling code words to said subsidiary exchanges in recurrent first time slots respectively assigned to the subsidiary exchanges and means for receiving signalling code words from said intermediate and terminal subsidiary exchanges in recurrent second time slots respectively assigned to said subsidiary exchanges;

said intermediate and terminal subsidiary exchanges (c) and (d) comprising means for transmitting signalling code words to said principal exchange in the second time slots and means for receiving signalling code words from said principal exchange in the first time slots; and said intermediate subsidiary exchanges (c) further comprising means for switching from the principal exchange towards a given terminal subsidiary exchange the signalling code words occurring on the first signalling trunk channels in the first time slots assigned to said terminal subsidiary exchange and means for switching from a given terminal subsidiary exchange towards the principal exchange the signalling code words occurring on the second signalling trunk channels in the second time slots assigned to said terminal subsidiary exchange.

2. A branched telephone switching system including:

a. a principal exchange;

b. first and second message and signalling trunk channels, said message trunk channels and said signalling trunk channels being separate channels;

c. intermediate subsidiary exchanges connected to said principal exchange through said first message and signalling trunk channels; and d. terminal subsidiary exchanges connected to said intermediate subsidiary exchanges through said second message and signalling trunk channels;

said principal exchange (a) comprising means for transmitting signalling code words to said subsidiary exchanges in recurrent first time slots respectively assigned to the subsidiary exchanges, means for receiving signalling code words including acknowledgment appendix signals from said intermediate and terminal subsidiary exchanges in recurrent second time slots respectively assigned to said subsidiary exchanges, means for checking the received signalling code words, and means for adding to the next signalling code word to be transmitted an acknowledgment appendix signal in response to said checking means;

said intermediate and terminal subsidiary exchanges (c) and (d) comprising means for transmitting signalling code words to said principal exchange in the second time slots assigned to said transmitting subsidiary exchange, means for receiving signalling code words from said principal exchange in the first time slots assigned to said receiving subsidiary exchange and acknowledgment appendix signals from said principal exchange in first time slots nonassigned to said receiving subsidiary exchange, means for checking the received signalling code words, and means for adding to the next signalling code word to be transmitted an acknowledgment appendix signal in response to said latter checking means;

said intermediate subsidiary exchanges (c) further comprising means for switching from the principal exchange towards a given terminal subsidiary exchange the signalling code words occurring on the first signalling trunk channels in the first time slots assigned to said terminal subsidiary exchange and the acknowledgment appendix signals occurring in the first time slots nonassigned to said terminal subsidiary exchange, and means for switching from a given terminal subsidiary exchange towards the principal exchange the signalling code words and acknowledgment appendix signals occurring on the second signalling trunk channels in the second time slots assigned to said terminal subsidiary exchange.

3. A branched telephone switching system including:

a. a principal exchange;

b. first and second message and signalling trunk channels, said message trunk channels and said signalling trunk channels being separate channels;

c. intermediate subsidiary exchanges connected to said principal exchange through said first message and signalling trunk channels; and terminal subsidiary exchanges connected to said intermediate subsidiary exchanges through said second message and signalling trunk channels;

said principal exchange (a) comprising means for transmitting signalling code words to said subsidiary exchanges in recurrent first time slots respectively assigned to the subsidiary exchanges, means for receiving signalling code words including acknowledgment appendix signals from said intermediate and terminal subsidiary exchanges in recurrent second time slots respectively assigned to said subsidiary exchanges, means for checking the received signalling code words, means for adding to the next signalling code word to be transmitted an acknowledgment appendix signal in response to said signalling code word checking means, means for checking the acknowledgment appendix signal, and means for selectively repeating the signalling code words in response to said acknowledgement appendix signal checking means;

said intermediate and terminal subsidiary exchanges (c) and (d) comprising means for transmitting signalling code words to said principal exchange in the second time slots assigned to said transmitting subsidiary exchange, means for receiving signalling code words from said principal exchange in the first time slots assigned to said receiving subsidiary exchange and acknowledgment appendix signals from said principal exchange in first time slots nonassigned to said receiving subsidiary exchange, means for checking the received signalling code words, means for adding to the next signalling code word to be transmitted an acknowledgment appendix signal in response to said signalling code word checking means, means for checking the acknowledgment appendix signal, and means for selectively repeating the signalling code words in response to said acknowledgment appendix signal checking means; and said intermediate subsidiary exchanges further comprising means for switching from the principal exchange towards a given terminal subsidiary exchange the signalling code words occurring on the first signalling trunk channels in the first time slots assigned to said terminal subsidiary exchange and the acknowledgment appendix signals occurring in the first time slots nonassigned to said terminal subsidiary exchange, and means for switching from a given terminal subsidiary exchange towards the principal exchange the signalling code words and acknowledgment appendix signals occurring on the second signalling trunk channels in the second time slots assigned to said terminal subsidiary exchange.